M. G. OTIS.
MOWING MACHINE.
APPLICATION FILED AUG. 20, 1909.

982,016.

Patented Jan. 17, 1911.
3 SHEETS—SHEET 2.

WITNESSES
Edw. Thorpe

INVENTOR
Milton G. Otis.
BY
ATTORNEYS

M. G. OTIS.
MOWING MACHINE.
APPLICATION FILED AUG. 20, 1909.
982,016.
Patented Jan. 17, 1911.
3 SHEETS—SHEET 3.
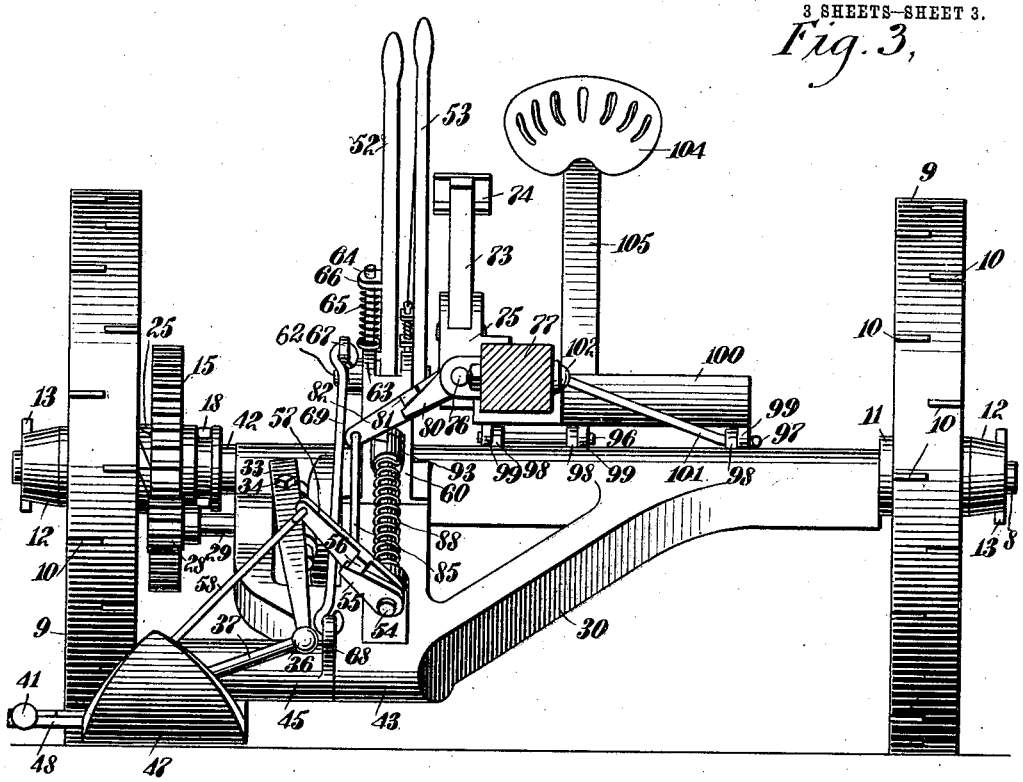
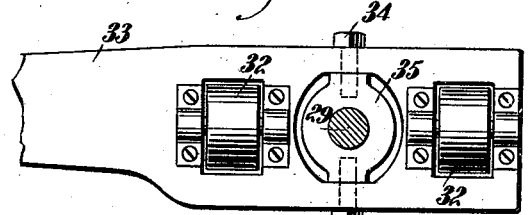
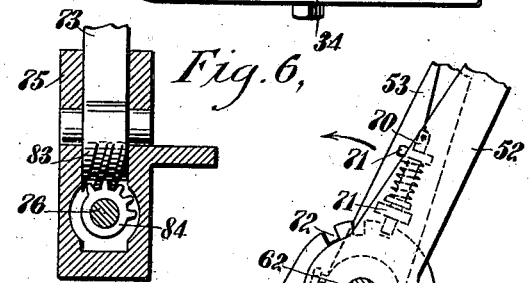
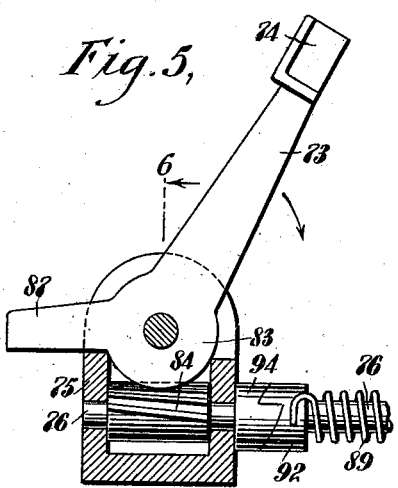
WITNESSES
E. Thorpe
C. F. Murdock
INVENTOR
Milton G. Otis.
BY
Munn & Co
ATTORNEYS

UNITED STATES PATENT OFFICE.

MILTON G. OTIS, OF ANIWA, WISCONSIN.

MOWING-MACHINE.

982,016.  Specification of Letters Patent.  Patented Jan. 17, 1911.

Application filed August 20, 1909. Serial No. 513,849.

*To all whom it may concern:*

Be it known that I, MILTON G. OTIS, a citizen of the United States, and a resident of Aniwa, in the county of Shawano and State of Wisconsin, have invented a new and Improved Mowing-Machine, of which the following is a full, clear, and exact description.

Among the principal objects which the present invention has in view are: to provide a construction wherein is provided improved means for driving the mower knife; to provide a construction whereby the carrier arm is rapidly actuated to answer the expediencies which arise in the operation of machines of this character; to provide improved means for connecting the draft mechanism to the cutter bar; and to provide an improved and simplified operating mechanism for reciprocating the cutter bar.

One embodiment of the present invention is disclosed in the structure illustrated in the accompanying drawings, in which like characters of reference denote corresponding parts in all the views, and in which—

Figure 1:
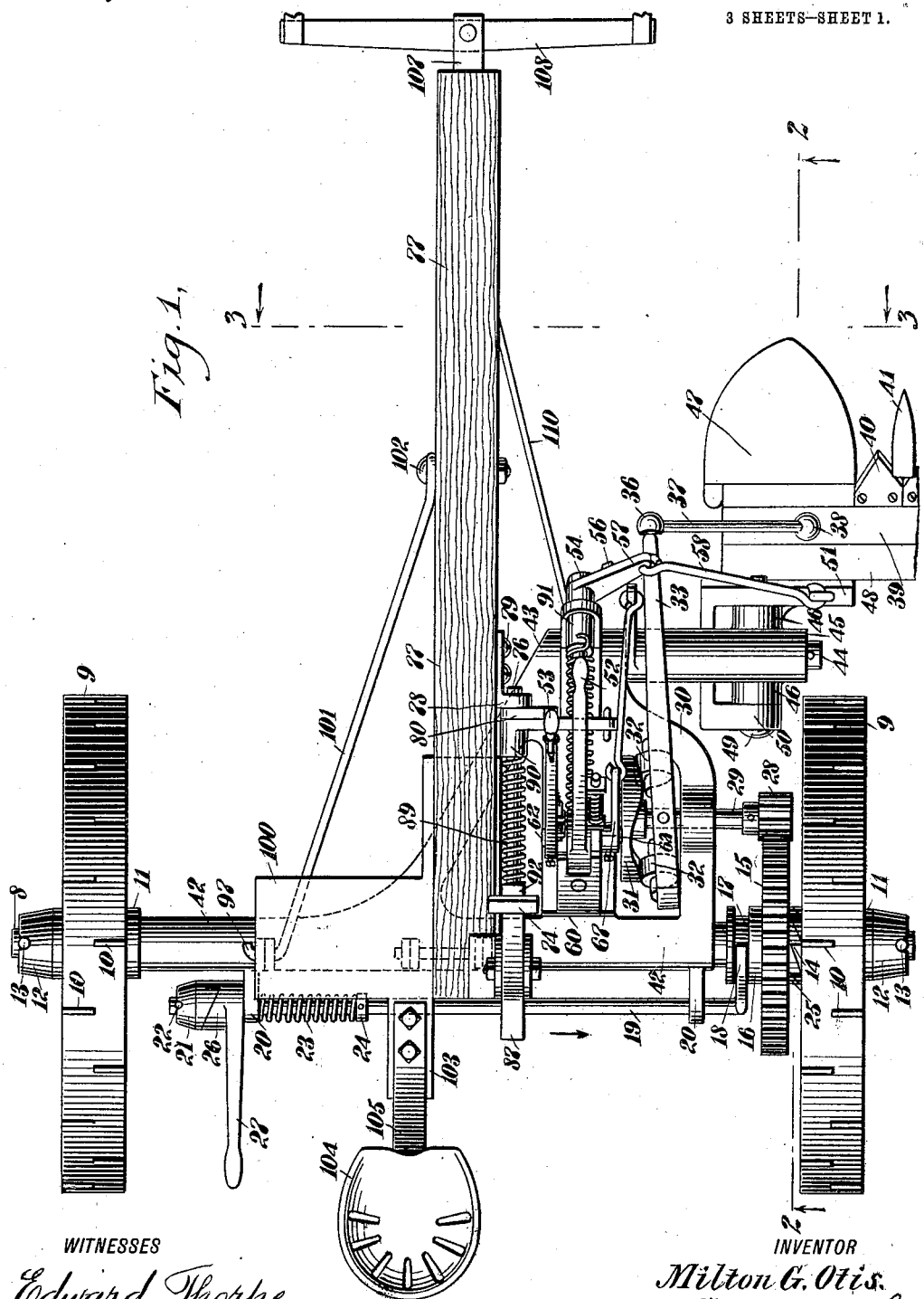
Figure 2:
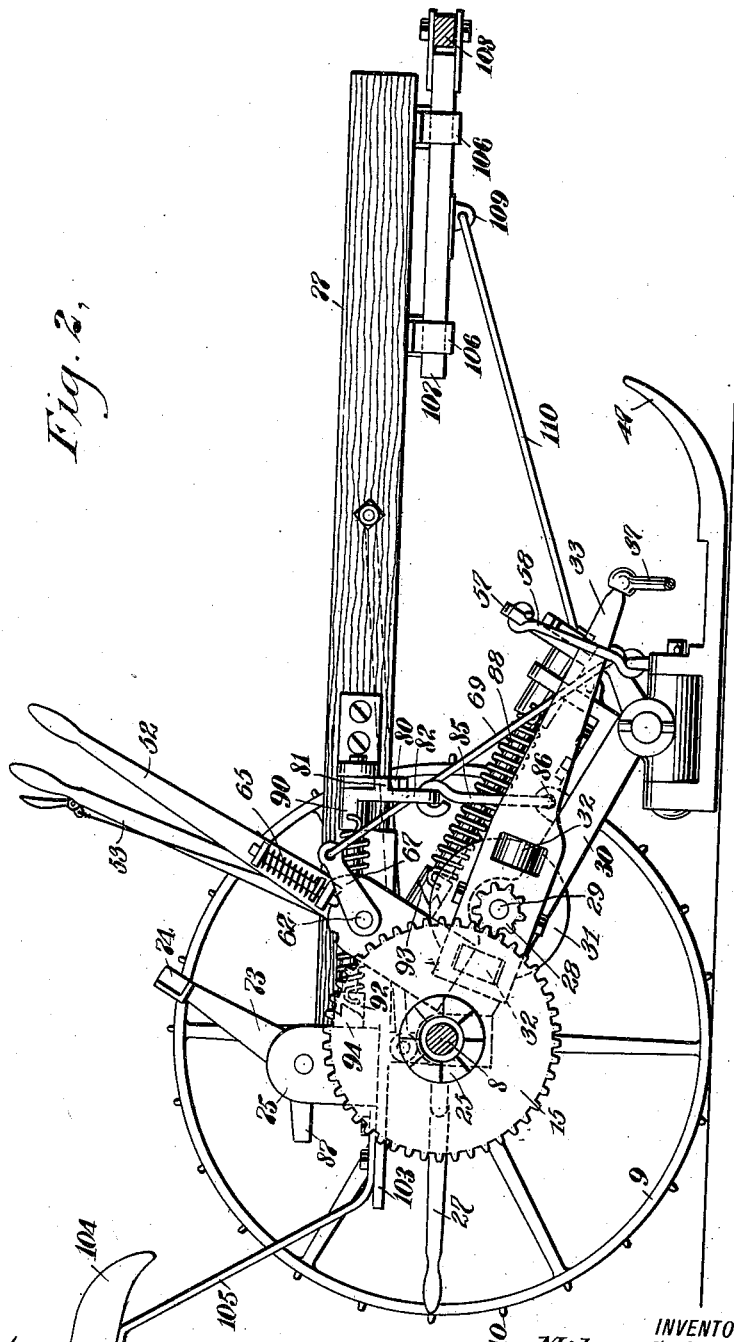

Figure 1 is a plan view of a mowing machine constructed in accordance with the present invention; Fig. 2 is a vertical section taken on the line 2—2 in Fig. 1; Fig. 3 is a front elevation, partly in section, the section being taken on the line 3—3 in Fig. 1; Fig. 4 is a detail view showing a fragment of the inner end of the reciprocating bar and the anti-friction rollers mounted thereon; Fig. 5 is a detail view in side elevation of the lever for raising the main frame; Fig. 6 is a detail view in section, taken on the line 6—6 in Fig. 5, of the lever and connection shown in Fig. 5; and Fig. 7 is a detail view in side elevation of a lower fragment of the levers for raising the cutter bar.

Upon an axle 8 are loosely mounted carrying wheels 9, 9. These wheels 9, 9 are suitably provided with calks 10, 10 to set the action of the wheels and prevent slipping. The wheels 9, 9 are also suitably provided with hubs 11, 11 which are held on the axle 8 by cylindrical washers 12, 12, which are suitably grooved to receive cotter pins 13, 13. On the inner side of the hub 11 of one of the wheels 9 are formed ratchet teeth 14. The hub is provided with an inward extension starting from the teeth 14 to form a bearing for a pinion 15 and a grooved hub 16 thereof. The hub 16 is provided with a groove 17 to receive a yoke 18 formed on the end of a controller bar 19.

The controller bar 19 is mounted in bearing brackets 20, 20 and has fixedly secured upon the end thereof a head 21 having a cam shaped face. The head 21 is held from rotating upon the controller bar 19 by a suitable cotter or other pin 22. Mounted upon the controller bar 19 is an expansion spring 23, which is held under compression between the brackets 20 and a collar 24 adjustably secured upon the bar 19. The operation of the spring 23 is to extend the controller bar 19 in the direction shown by the arrow in Fig. 1 of the drawings, which, operating through the yoke 18 upon the hub 16 and pinion 15, causes the ratchet teeth 25 formed on the face of the said pinion, abutting the teeth 14 on the hub of the wheel 9, to engage the said teeth 14. The teeth 25 are disengaged from the teeth 14 by means of a cam faced collar 26, the cam faces of which correspond with the cam faces on the head 21. Fixedly mounted upon the collar 26 is a lever 27 whereby the said collar is rotated. As illustrated in Fig. 1 of the drawings the position of the head 21 and the collar 26 is such that the controller bar 19 is extended by the spring 23 to cause the engagement of the teeth 25 and the teeth 14. When, however, the lever 27 is raised to the vertical position, rotating the cam 26 one-quarter of a revolution, which brings the back of each of the cam faces in line, the head 21, and with it the bar 19, the yoke 18, and parts connected therewith, are extended in the direction reverse of that shown by the arrow in Fig. 1 of the drawings. The throw of the cams on the collar 26 and head 21 is sufficient to withdraw the teeth 25 from engagement with the teeth 14. Any suitable form of lock may be provided to hold the lever 27 in the raised position.

It is through the pinion 15 that the controller bar receives the power which is converted into the necessary reciprocations for the operation of said bar. The transmission of the motion received from the wheel 9 having the ratchet teeth 14, is first through the pinion 15 and a smaller pinion 28 with which it is engaged. The pinion 28 is fixedly mounted on a short shaft 29, which is provided with suitable bearings in a carrying frame 30. The cam wheel 31 is fixedly mounted on the shaft 29, and the rollers 32, 32 are mounted upon a lever 33 and at each side of the center of the wheel 31. The lever 33 is pivotally mounted at 34 to a fixed bearing 35 which is mounted upon the frame 30. The bearing 35 extends between the hub of the wheel 31 and the side of the bearing formed in the frame 30 for the shaft 29. At the outer end of the lever 33 it is properly provided with a ball to fit in a socket 36 formed on the end of a short pitman 37. The pitman 37 is similarly connected by a socket 38 to a knife bar 39, upon which are fixedly and suitably mounted blades 40. As in the usual moving machines the blades 40 are reciprocated in slots provided in fingers 41.

When now, with a construction as above described, the lever 27 is depressed to the position shown in Fig. 1 of the drawings, the spring 23 throws the bar 19, and through the bar 19 the pinion 15, so that the teeth 25 of the said pinion are engaged by the teeth 14 on the wheel 9. The engagement of the two sets of teeth causes a rotation of the pinion 28, the number of rotations being proportioned to the comparative diameters of the pinions 15 and 28. The rotation of the pinion 28, shaft 29 and crown cam wheel 31 produces a rapid rocking of the lever 33, the oscillations depending upon the number of cam rises formed upon the wheel 31. The arrangement of the cam rises on the wheel 31 is such that on the same diameter a cam on the one side of the wheel 31 is in line with a depression on the other side of the wheel 31. The result of this arrangement of rises and depressions is, that when the roller 32 on the one side of the bearing 35 is moved in one direction the roller 32 on the opposite side of the bearing 35 is moved in the opposite direction. Each of the rollers rising and falling in rapid succession, and in such disposition, produces an oscillation or rocking of the free end of the lever 33. As above stated, the arrangement for mounting the shaft 29 provides for a thrust bearing whereby the shaft may be laterally moved to compensate for the wear between the cam wheel 31 and the rollers 32, 32.

The above described operating mechanism is simple in construction and action, and permits of a design wherein the element of strength may be provided for irrespective of the surrounding structural elements.

The carrying frame 30 is preferably formed of cast metal which is constructed to as light a weight as possible. In the present drawings the frame is illustrated as providing a continuous elongated sleeve 42, through which the axle 8 is passed. From the sleeve 42 is extended a harp-like hanging frame, the central portions of which form bearings for the shaft 29, and converge at the lower end to form a head 43. Within the head 43 is fixedly anchored a steel shaft 44, upon which is mounted a bearing sleeve 45, from which are depended bearing extensions 46, 46. It is directly upon the extensions 46, 46 that a shoe 47 and cutter bar 48 fixedly mounted thereon are pivoted, a pivot bolt 49 passing through the extensions 46, 46 and wings 50 and 51 with which the structure of the shoe is provided. By means of this construction it will be noticed that a double action is produced. The sleeve 45 permits the rotation of the shoe 47 and parts connected therewith about the shaft 44 and in the line of the draft of the mowing machine. The pivotal mounting about the extensions 46 permits the rotation of the shoe 47 and parts connected therewith about the pivot 49, or transversely to the line of draft. The former of the two actions is required when it is desired to upset the shoe 47 and the cutter bar 48 to raise the cutting action of the knife 40, or to lift the fingers 41 from an obstruction.

The latter of the two actions above described permits the raising upward and inward of the cutter bar 48 until the same is disposed in a vertical or carrying position. It is to produce the two actions above described that I have provided levers 52 and 53 and the transmission elements connected therewith. The lever 52, when raised to the vertical position, operates to rock a shaft 54 to cause a short lever 55 to extend under a projection 56 on the side of a lever 57, causing the same to rise toward the vertical position. The lever 57 is connected by means of a pull rod 58 with the wing 51 of the structure of the shoe 47. The point of connection of the rod 58 being at the outside of the pivot 49, the shoe 47 and cutter bar 48 connected therewith are caused to pivot upon the pivot 49, which results in the cutter bar being lifted lengthwise and carried to a substantially vertical position. This action is primarily as stated, by rotating the shaft 54. The rotation thus produced is by means of a segmental spiral gear 59, which is fixedly mounted upon the shaft 54, and is held in bearings in a vertical bracket 60 mounted upon the frame 30. The spiral gear 59 is mounted in toothed engagement with extended spiral teeth formed on the circular head 61 of the lever 52. The lever 52 is pivotally mounted on a rocking shaft 62, which is extended through the opposite sides of the bracket 60, and has formed therein suitable bearings. The bracket 60 is formed of a hollow construction, substantially as illustrated in Fig. 7 of the drawings, and the upper ends thereof are separated to hold and guide the lever 52. The ends are also rounded, as shown in Fig. 7 of the drawings, and the upper edges thereof are serrated to form teeth to engage the spring actuated detents provided to hold the levers 52 and 53 in the said position. The lever 52, as stated, is mounted between the sides of the bracket 60, and the outer side 63 is serrated or provided with teeth to receive a detent bolt 64. The detent 64 is seated by means of a spiral spring 65 mounted to surround the body of the bolt and to be held in compression between an upper lug 66 and a collar mounted on the said bolt. The sides of the bracket 60 are built up at the ends of the quadrant or parts of the said sides of the bracket provided with teeth, to impinge upon the holding structure for the said bolts, to prevent the movement beyond a certain limit. In this manner the weight of the shoe 47 and the cutter bar 48 is carried by the lever beyond a certain point or depression, thus preventing the said cutter bar from falling into hollows or certain depressions.

It will be observed that by means of this construction wherein is utilized the increased leverage of the spiral gears, the manual strain required to be exerted upon the lever 52 is greatly diminished. Through the strain requisite being diminished the adjustment of the cutter bar is much finer than would otherwise occur in mechanisms having a more direct lift. Further, it will be observed that the upward lift of the shoe 47 and cutter bar 48 is not prevented by the lever 52 and its connections, for the reason that the lever 57 is raised by the under lift of the lever 55, and is not thereby prevented from rising when impelled thereto by the action of the said shoe and cutter bar.

It is by means of the lever 53 that the shaft 62 is rotated, and the toe of the shoe 47 and the points of the fingers 41 are raised. The shaft 62 is fixedly attached to the lever 53 on the outside of the bracket 60. On the ends of the shaft opposite the attachment to the lever 53 there is fixedly mounted a lever arm 67. The lever arm 67 is connected to a lever arm 68 integrally formed with the sleeve 45, by means of a pull rod 69. The lever 53 is provided with a detent 70, which is suitably mounted by means of loops 71, 71 on the side of the lever 53 to strike into teeth 72 formed in the side of the bracket 60 and at the upper end thereof. The operation of the detent 70 is in all respects similar to the action of the detent 64 above described. Thus, it will be seen, by means of a construction arranged as described, the reciprocation of the cutter bar may be controlled to start or stop, by the manipulation of the lever 27 disposed within easy reach of the operator; also it will be seen that by the raising of either of the levers 52 or 53 the cutter bar, in the first instance, may be swung upon the pivot 49 to the position substantially vertical; and by the operation of the lever 53, as described, the shoe 47 and the cutter bar 48 may be rocked upon the pivot shaft 44 to raise the toe of the shoe and the points of the fingers of the said cutter bar.

A further adjustment in this machine is provided in that the lower head of the carrying frame may be raised from the ground. This is accomplished by means of a lever 73 at the upper end of which is provided a foot rest 74, this being a foot operated lever. The lever 73 is mounted directly in bearings formed in the upper end of a bracket 75. The bracket 75 is hollow and forms bearings for a shaft 76. The shaft 76 is extended lengthwise of a draft beam 77 of the machine, and is provided with a bearing in a bracket 78 suitably secured on the said beam by means of lug screws or other suitable form of fastening. Fixedly mounted upon the shaft 76 is a lever arm 80 which is extended under to impinge upon a projection 81 set out from the side of a lever arm 82, which is loosely mounted upon the shaft 76. The lever 73 is provided with a rounded head 83 in which are formed spiral gear teeth adapted to engage the spiral gear teeth of a segmental gear 84, which is fixedly mounted upon the shaft 76 within the bracket 75. This mounting is similar to the mounting provided on the shaft 54, and the action imparted by the throw of the lever 73 is similar to that produced by the throw of the lever 52.

The lever arm 82 is connected by means of a pull rod 85 to the frame 30 and to an eyelet 86 formed thereon. The gears formed in the head 83 and in the segment 84 are so fixed that by the forward thrust of the lever 73 the shaft 76 is rotated to bring the lever arm 80 under the projection 81, when the continuance of the movement of the arm 80 raises the arm 82, lifting the forward end of the frame 30 or the head 43. It is to the head 43, it will be remembered, that the cutter bar 48 and shoe 47 are connected, therefore, in lifting the head 43 there are also lifted the shoe 47 and the cutter bar 48. The lever 73 is provided with an extension 87, which is provided as a stop whereby the shaft 76 is prevented from rotating to rotate the forward end of the frame 30 or the head 43 beyond a predetermined position.

On the shaft 54 and the shaft 76 there are coiled under tension spiral springs 88 and 89. The function of these springs is to assist in the rotation of the shafts to which they are connected to aid in the lifting of the structural elements connected therewith. The springs are anchored at the one end to the hub 90 of the lever arm 82, in the one instance, and to the hub 91 of the lever 57 in the other instance. In each case the free end of the spring is anchored in collars 92 and 93, respectively, on the two shafts 76 and 54. These collars 92 and 93 have serrated or ratchet tooth faces adapted to engage collars 94 and 95, which are fixedly mounted on the brackets 60 and 75, respectively. Whenever, in the course of operation, the springs 88 and 89 become weakened, or added expansive force is desired, the collars 92 and 93 are rotated on the shafts upon which they are mounted, backward against the expansion of the springs 88 and 89. The springs 88 and 89 serve the further purpose of buffering or softening the drop of the heavy structural parts, which is liable to occur during the handling of the machine.

The draft beam 77 is secured to the frame 30 by means of bolts 96 and 97, which are extended through up-set ears 98, 98 formed integrally with the frame 30, or rigidly secured thereto, and ears 99, 99 formed on the draft beam 77, and a foot rest 100 which is secured rigidly to the said draft beam. The draft beam is braced by a hound brace 101 extended from a bolt 102 to the ears 98 and 99, through which the end is extended to form the bolt 97. It is upon a plate extension 103 that a riding seat 104 is mounted by means of a spring 105. The draft bar 77 is provided on the under side with depended guides 106, 106 in which is supported a sliding bar 107. The sliding bar 107 is directly coupled by means of suitable thills with a swingle bar 108. Depended from the under side of the sliding bar 107 is an eyelet 109. The eyelet 109 is connected with a pull rod 110, the opposite end of which is pivotally connected to the head 43. It will thus be seen that the draft of the team is primarily exerted upon the frame 30 and at a point approximately level with the cutter bar of the machine. By means of this arrangement the shoulder draft of the team may be accommodated to lift the cutter bar on rising ground to prevent the digging into the soil of the fingers 41. Further, by means of this hitch, undue strains upon the cutter bar and consequent retardation of the machine, operate to lift the cutter bar to free it from the choke which causes the majority of heavy or dragging actions in machines of this character.

It is deemed unnecessary to describe the operation of the machine in its cutting, as in this particular it resembles the class to which it belongs.

Having thus described my invention what I claim as new and desire to secure by Letters Patent is:—

1. A mowing machine comprising a cutter bar embodying open finger guards and a reciprocating knife bar; an auxiliary shaft rotatively mounted in the carrying frame of said machine in adjacent relation to the hub of the carrying wheel of said machine; a cam wheel fixedly mounted on said shaft; an elongated rocking lever pivoted concentrically with said cam wheel and connected with said knife bar to reciprocate the same; and a driving mechanism to rotate said shaft, embodying a traction wheel of said machine, and a train of gear wheels connecting said auxiliary shaft and said traction wheel.

2. A mowing machine comprising a cutter bar embodying open finger guards and a reciprocating knife bar; a driving shaft for the machine fixedly connected to a carrying wheel to be rotated thereby; an auxiliary shaft rotatively mounted in the carrying frame of said machine and operatively connected with said driving shaft; a cam wheel fixedly mounted on said shaft and provided with cam surfaces laterally extended from one side of said wheel, said cam surfaces being disposed in such manner that each rise is on a diametric line with a depression; a rocking lever pivoted concentrically with said cam wheel and connected with said knife bar to reciprocate the same, said lever having a plurality of friction rollers disposed to ride said cams on opposite sides of the center of said cam wheel; and a driving mechanism embodying a traction wheel of said machine.

3. A mowing machine comprising a forwardly depressed inclined carrying frame having open spaces and parallel supporting arms; a cutter bar pivotally mounted upon said carrying frame and embodying open finger guards and a reciprocating knife bar; a driving shaft for the machine fixedly connected to a carrying wheel to be rotated thereby; an auxiliary shaft rotatively mounted in the carrying frame of said machine and having bearings in the said supporting arms thereof and operatively connected with said driving shaft; a cam wheel fixedly mounted on said shaft and provided with cam surfaces laterally extended from one side of said wheel, said cam surfaces being disposed in such manner that each rise is on a diametric line with a depression; a rocking lever pivoted concentrically with said cam wheel and connected with said knife bar to reciprocate the same, said lever having a plurality of friction rollers disposed to ride said cam surfaces on opposite sides of the center of said cam wheel; and a driving mechanism to rotate said shaft, embodying a traction wheel of said machine.

4. A mowing machine comprising a cutter bar embodying open finger guards and a reciprocating knife bar; a driving shaft for the machine fixedly connected to a carrying wheel to be rotated thereby; an auxiliary shaft rotatively mounted in the carrying frame of said machine and operatively connected with said driving shaft; a cam wheel fixedly mounted on said shaft and provided with cam surfaces laterally extended from one side of said wheel, said cams being disposed in such manner that each rise is on a diametric line with a depression; a bearing block mounted on said frame to hold the said cam wheel in position; a rocking lever disposed in adjacent relation to said cam wheel and pivoted on said bearing block and concentrically therewith and connected with said knife bar to reciprocate the same, said lever having a plurality of friction rollers disposed to ride said cam surfaces on opposite sides of the center of said cam wheel; and a driving mechanism to rotate said shaft embodying a traction wheel of said machine.

In testimony whereof I have signed my name to this specification in the presence of two subscribing witnesses.

MILTON G. OTIS.

Witnesses:
 WILLIAM H. BOTTRELL,
 JOHN BENISHEK.